Aug. 2, 1966    J. P. DAVIS ET AL    3,264,454
DIGITAL DEVICE FOR MEASURING TIME INTERVALS
Filed Sept. 24, 1962    4 Sheets-Sheet 1
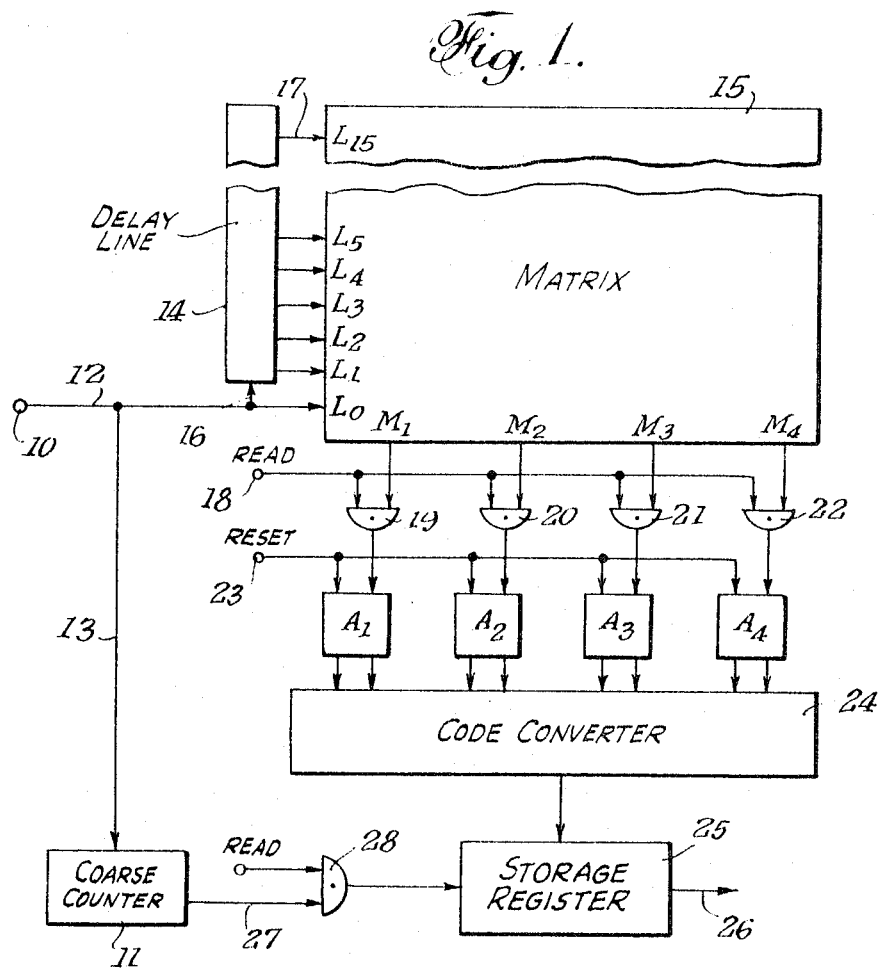
INVENTORS
JON P. DAVIS
GEORGE A. WALTHERS
BY
C. L. Stratton
ATTORNEY

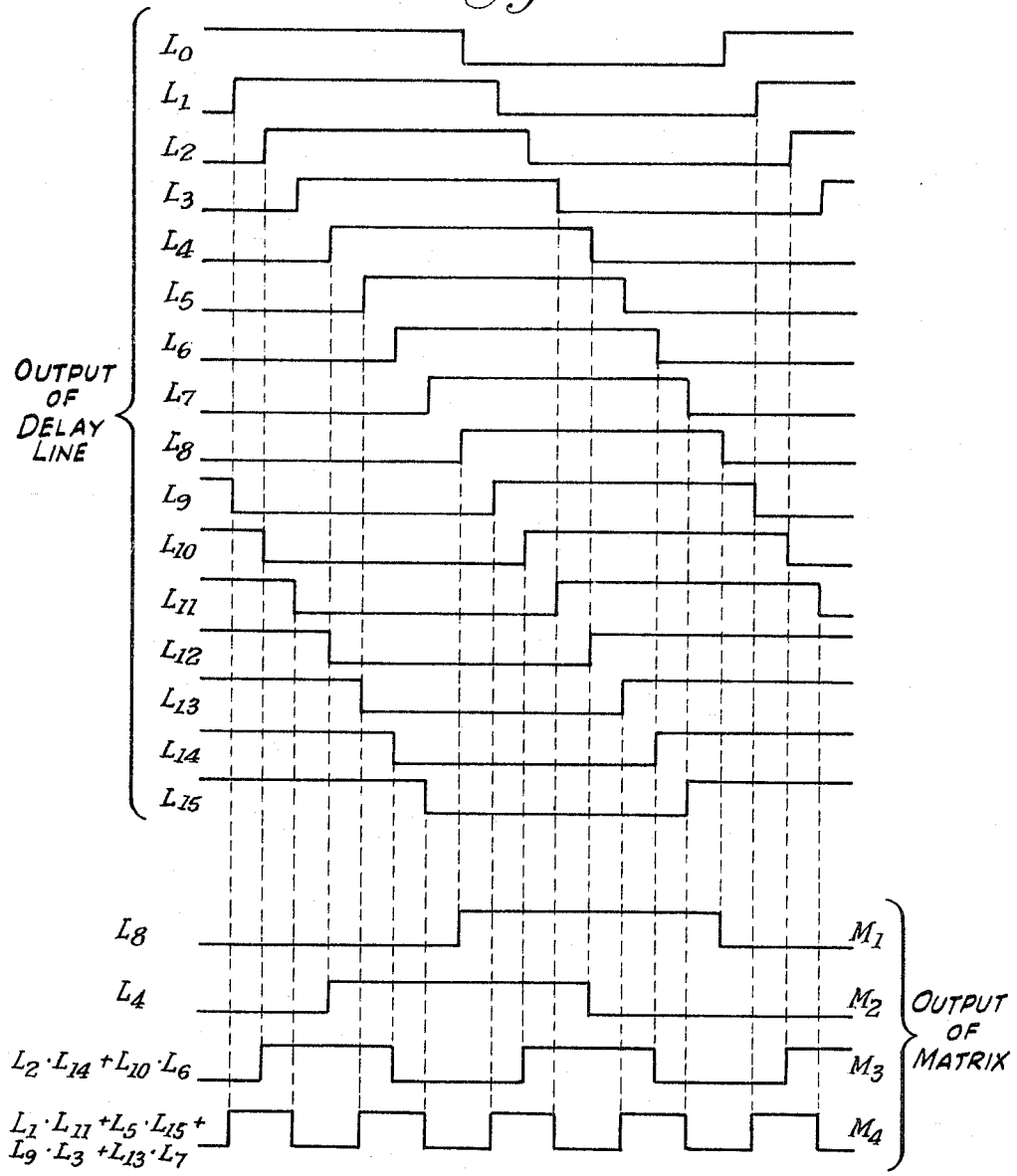

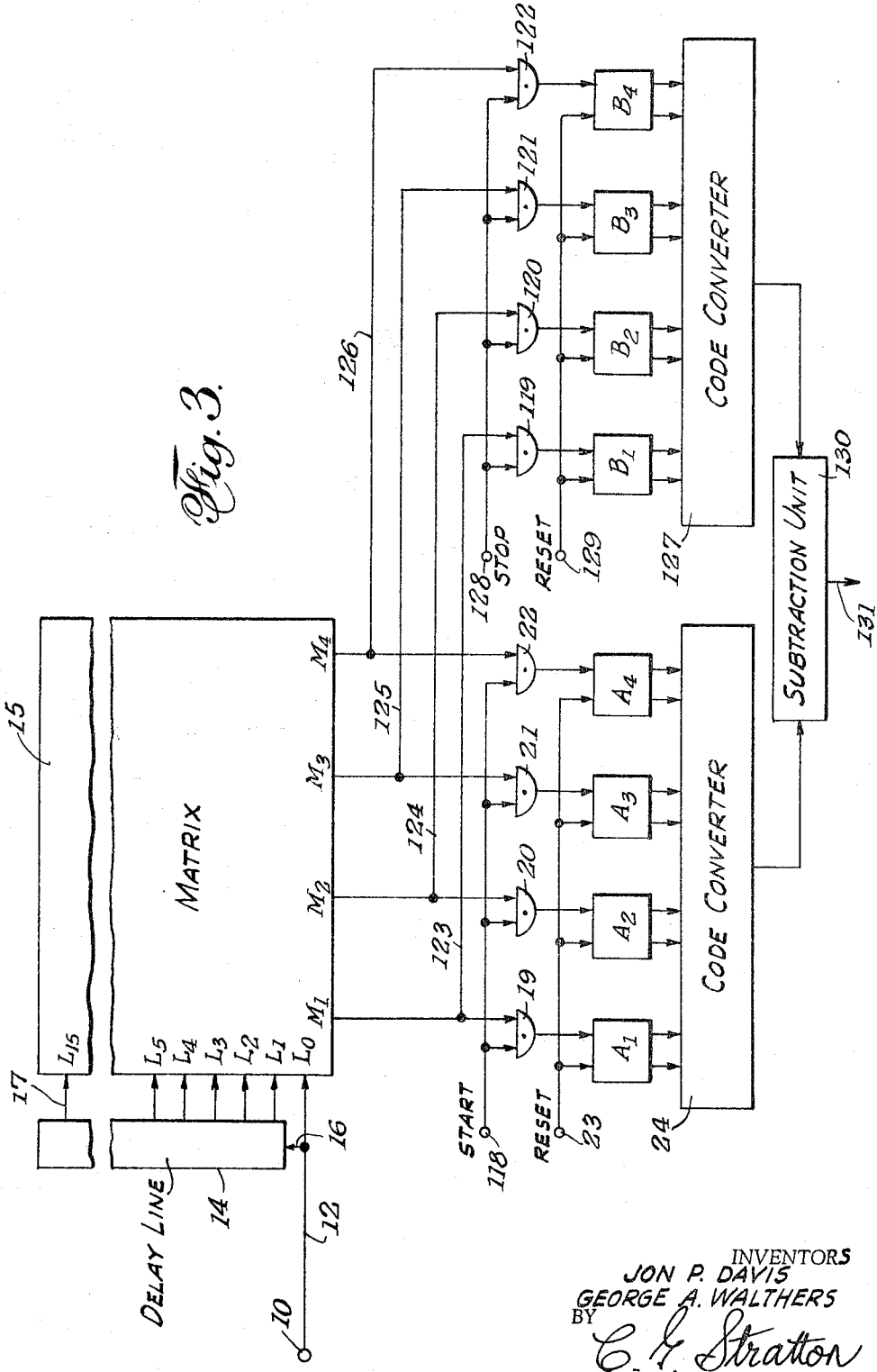

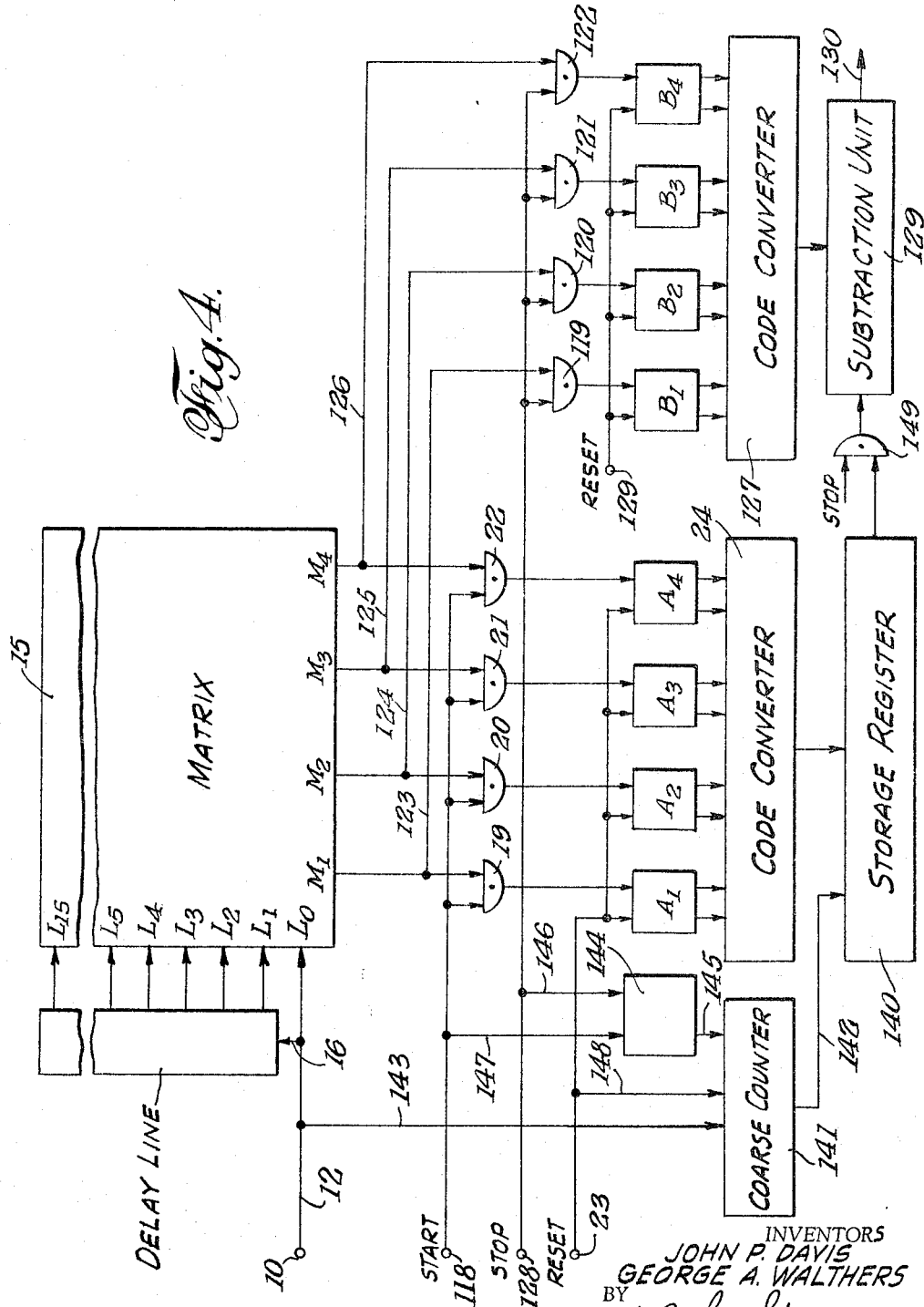

United States Patent Office 3,264,454
Patented August 2, 1966

3,264,454
DIGITAL DEVICE FOR MEASURING
TIME INTERVALS
Jon P. Davis, Burbank, and George A. Walthers, Los Angeles, Calif., assignors to Canoga Electronics Corporation, Van Nuys, Calif., a corporation of Nevada
Filed Sept. 24, 1962, Ser. No. 225,713
3 Claims. (Cl. 235—92)

The present invention relates to a device for effecting a digital method of measuring small time intervals.

More particularly, the device of the invention comprises an arrangement wherein individual pulses or cycles of a high frequency square wave timing signal are subdivided by a multi-tap output delay line into a plurality of similar signals characterized by the phases of the similar signals being equally displaced with respect to each other throughout a full period of a pulse or cycle of the input or timing signal. The degree of phase displacement between the similar signals is equal to the smallest time interval to be measured. The outputs of the delay line are applied to a switching matrix which operates to regroup the outputs of the delay line into still another series of signals whose wave forms or states define a digital counting code. The resultant digital code is utilized in conjunction with a flip-flop register in the presence of other timing pulses to measure small time intervals represented by increments of the pulse or cycle period of the high frequency timing signal. In this manner the device of the invention is capable of measuring extremely small time intervals since the number of increments into which the period of a pulse or cycle of the high frequency timing signal is divided is controlled by the number of output taps provided on the delay line.

This invention has particular use in the field of radar where it is frequently desired to measure fractions of the radar pulse in addition to the whole pulses appearing in the transmitted and echo-returned signal. The invention also finds use as a means for counting at very high bit rates, and as a means for very accurately measuring small time intervals separating random events or signals.

Accordingly, it is an object of the present invention to provide a device capable of measuring small time intervals by a digital method.

Another object is the provision of a digital device capable of counting at a high bit rate.

Still another object of the invention is the provision of means whereby small increments of high frequency pulses may be measured or counted.

A further object is the provision of means whereby a switching matrix is utilized to produce a digital code from a fixed frequency signal by effecting successive phase shift of the signal.

Another object of the invention is the provision of means whereby the wave forms of a binary counter are produced by means responsive to a series of phase shifted signals derived from a high frequency signal having a fixed frequency corresponding to the frequency of the signals comprising the series.

Further objects and additional advantages of the invention will become apparent to those skilled in the field to which it pertains from a consideration of the following detailed description and drawing, wherein:

FIG. 1 is a schematic representation of one form of the invention;

FIG. 2 is a timing diagram of various signals utilized by the device of the invention;

FIG. 3 is a schematic representation of a second form of the invention; and

FIG. 4 is a schematic representation of a third form of the invention.

In FIG. 1, the invention is shown in an embodiment utilized for the precise measurement of time intervals of short duration that would be encountered in many radar systems, for example. In such a case, the transmit-signal of the radar system would be derived from a driving signal applied to the input terminal 10 of the embodiment shown in FIG. 1, thereby assuring a synchronous relationship between the radar pulses and the driving signal. A typical driving signal might have a frequency of the order of five megacycles while the radar transmit-signal frequency might, in certain applications, be of the order of 500 cycles per second. Often in the use of such radar systems it is desirable to measure the transmission-echo period in terms of the time interval represented by integral numbers of pulses of the signal and additionally the time represented by a fraction of the pulse period.

Counting or time measurement of the complete cycles or pulses of the input signal is effected by a coarse counter 11 which receives the signal through connections 12 and 13. This counter may be of a conventional type capable of counting at a five megacycle or higher bit rate.

Measurement of the fractional portion of a cycle of the radar signal which may be included in the transmission and echo signal is accomplished by means of a high speed counter comprising a delay line 14 and a diode matrix 15. The delay line is of conventional construction, having an input to which the five megacycle signal is applied through connection 16 from connection 12. A plurality of output taps on the delay line provides a series of phase shifted square wave signals derived from the input signal by the provision of equal delays between successive taps. The square wave signals are applied through connection 17 to the inputs $L_1$–$L_{15}$ of the diode matrix. It is to be noted that the input signal to the delay line is applied to the input $L_0$ of the matrix without phase shift.

As may be seen in the timing diagram of FIG. 2, the output signals $L_1$–$L_{15}$ from the delay line progress in equal degrees of phase shift from the input signal represented as $L_0$–$L_{15}$ which is 360° out of phase with the input signal. Each increment of phase shift between these signals is equal to the smallest time interval to be measured.

The matrix 15 consists of "and" and "or" gates which are logically arranged in accordance with standard techniques to provide four output signals $M_1$–$M_4$ which produce the wave forms of a sixteen count binary counter. In the present example, the signals $M_1$–$M_4$, as shown in FIG. 2, constitute a reflected Gray binary code which is utilized to avoid ambiguities and to simplify the logic in the matrix. The $M_1$ and $M_2$ output signals correspond to the $L_8$ and $L_4$ signals, respectively, introduced into the matrix. The $M_3$ signal goes true with the $L_2$ and $L_{10}$ signals, and goes false with the $L_{14}$ and $L_6$ signals. And the $M_4$ signal goes true when the $L_1$, $L_5$, $L_9$ and $L_{13}$ signals go true, and goes false as the $L_{11}$, $L_{15}$, $L_3$ and $L_7$ signals go false. While the signals $L_0$ and $L_{12}$, shown applied to the matrix, are not utilized in the reflected Gray code, they are necessary in the event other binary codes may be desired at the output of the matrix.

Thus, the outputs $M_1$–$M_4$ of the matrix will cyclicly assume the appropriate true and false states of a sixteen count reflected Gray code. This count will always start with each square wave pulse of the five megacycle radar signal. Accordingly, as the count progresses in equal steps from one-sixteenth of the period of the input square wave to the full period, it will provide proportionate time interval representations of equal time divisions of the period.

The true and false states of the outputs $M_1$–$M_4$ are utilized to similarly set corresponding flip-flops $A_1$–$A_4$ upon the receipt of a read or "interrogate" pulse derived from the echo signal at terminal 18. This is effected through "and" gates 19–22, each of which is commonly connected to terminal 18 and corresponding outputs $M_1$–$M_4$. The flip-flops $A_1$–$A_4$ are reset to zero by a pulse applied to reset terminal 23. The reset signal may be derived from the radar signal at the beginning of each radar transmission, thus zero-setting the flip-flops at the beginning of each counting cycle of the counting matrix 15.

An appropriate conventional code converter 24 is connected to the outputs of flip-flops $A_1$–$A_4$ to permit conversion of the reflected Gray code derived by outputs $M_1$–$M_4$ to the particular binary code utilized in the coarse counter 11.

The outputs of the code converter and coarse counter 11 are combined in a conventional storage register 25 having the desired number of bit positions. The fine count portion represented by the output of the code converter is in reality a part of the final output 26 and is simply placed in its proper position bitwise with respect to the coarse part of the output information in the normal operation of the storage register. Thus, the final output, which may appear in serial or parallel form, will be represented by bit positions of the storage register such that the coarse portion of the count will appear as $2^n$ ... $2^6$ $2^5$ $2^4$, and the fine portion as $2^3$ $2^2$ $2^1$ $2^0$. The output of the coarse counter 11 may either be directly connected to the summation device or through an "and" gate 28 which is triggered by the read pulse.

The modification shown in FIG. 3 provides an arrangement whereby the time interval separating two randomly occurring events may be measured. This arrangement utilizes the same delay line, matrix, "and" gates 19–22, flip-flops $A_1$–$A_4$, and code converter 24, of the device of FIG. 1. A second set of "and" gates 119–122 is included, which gates are connected in parallel by connections 123–126 to the outputs $M_1$–$M_4$. The outputs of the "and" gates are applied to corresponding flip-flops $B_1$–$B_4$ whose outputs are applied to a code converter 127 identical to that shown at 24 in FIG. 1. Each of the flip-flop registers $A_1$–$A_4$ and $B_1$–$B_4$ receives a reset signal from terminals 23 and 129, respectively. The reset signal which is utilized to zero-set the two registers is suitably generated by the driving system.

As in the previously described embodiment, the counter, comprising delay line 14 and matrix 15, cyclicly generates a sixteen count Gray code from a high frequency square wave driving signal applied to input terminal 10. When the first random occurrence or pulse occurs in the driving system, the states of the matrix outputs $M_1$–$M_4$ are gated to the flip-flops $A_1$–$A_4$ by a "start" signal applied to each of the "and" gates 19–22 from terminal 118. When the second occurrence or pulse occurs, the counts represented by the outputs $M_1$–$M_4$ are gated by a "stop" signal applied to each of the "and" gates 119–122 from terminal 128 to the flip-flops $B_1$–$B_4$. The outputs of the two code converters are then applied to a standard digital subtraction unit 129 whose output 130 is representative of the time interval between the first and second random pulses.

FIG. 4 shows still another modification of the invention which is capable of measuring, by counting, time intervals between random pulses which are longer in duration than the time required for the matrix 15 to cycle through its full count series. This arrangement differs from that of FIG. 3 in that it includes means for introducing the coarse count to a storage register 140 which also registers the fine count in combination with the coarse count in the manner described in conjunction with the storage register 25 of FIG. 1. This latter means comprises a conventional coarse counter 141 whose output is supplied by connection 142 to the storage register 140, a connection 143 to supply the five megacycle signal from terminal 10 to the counter 141, a control flip-flop 144 which provides output signals through the connection 145 to start and stop the counter 141 in response to input "start" and "stop" signals supplied to the input of the control flip-flop through connections 146 and 147 in circuit with terminals 118 and 128, respectively, and a connection 148 to supply a "reset" signal from terminal 23 to the counter. The output of the storage register is supplied to the subtraction unit 129 by the output of "and" gate 149 upon the receipt of the "stop" signal at its input.

In the above arrangement, the matrix counter 15 will continue its cyclic counting repetitively. When the first random pulse occurs, the "start" pulse will cause the coarse counter 141 to start counting integral time periods corresponding to the full count time of the matrix, and the fine count to register in the storage register. When the second random pulse occurs, the "stop" signal will actuate the "and" gates 119–122 to cause the particular count of the matrix to register in the subtraction unit 129 where it will be subtracted from the output of the storage register, which will also be registered in the subtraction unit by conduction of the "and" gate 149. Accordingly, the output 150 of the subtraction unit will be indicative of the time duration between the first and second random pulses.

From the foregoing, it should be apparent to one skilled in the art that means have been provided for accurately measuring smaller time intervals than can be measured by prior art techniques. While in the above described embodiments only four flip-flops and a sixteen count counter arrangement have been used, it is to be understood that the input wave may be shifted smaller degrees and may also be of higher frequency, thus affording larger counts embodying a larger number of bits to be developed from the matrix. Also, the flip-flops $A_1$–$A_4$ and $B_1$–$B_4$ may be constructed from tunnel diodes to provide the rapid response necessary to accommodate such high counting frequencies.

While specific embodiments of the invention have been described in the foregoing description, it will be understood that various modifications within the spirit of the invention may occur to those skilled in the art. Accordingly, it is intended that no limitation be imposed on the invention except as defined by the scope of the appended claims.

Having thus described the invention, what is claimed and desired to be secured by Letters Patent is:

1. A device for determining time intervals which comprises:
 (a) delay means responsive to an input signal of fixed frequency for producing a series of output signals, each output signal of said series having different phase displacement with respect to all other signals of said series, said input and output signals being of the same frequency,
 (b) circuit means responsive to said output signals for arranging said output signals into a second series of signals defining a digital counting code,
 (c) gating means connecting said second series of signals to a register comprising a plurality of flip-flops, said gating means being responsive to a triggering signal to transmit the particular count of said code coincident with the application of said triggering signal to said register, and
 (d) second gating means connecting said second series of signals to a second register comprising a plurality of flip-flops, said second gating means being responsive to a second triggering signal to transmit the particular count of said code coincident with the application of said second triggering signal to said second register.

2. A device for determining time intervals according to claim 1 including comparing means responsive to the outputs of said first and second registers for comparing the counts in said first and second registers.

3. A device for determining time intervals according to claim 2 wherein a count storage means is interposed in circuit between said first register and said comparing means.

References Cited by the Examiner

UNITED STATES PATENTS

| | | | |
|---|---|---|---|
| 2,738,499 | 3/1956 | Sprick | 340—347 |
| 3,030,614 | 4/1962 | Lehan et al. | 340—347 |
| 3,075,189 | 1/1963 | Lisicky | 340—347 |

DARYL W. COOK, *Acting Primary Examiner.*

MALCOLM A. MORRISON, *Examiner.*

J. F. MILLER, *Assistant Examiner.*